US012391329B2

(12) United States Patent
Tanaka

(10) Patent No.: US 12,391,329 B2
(45) Date of Patent: Aug. 19, 2025

(54) STRADDLED VEHICLE

(71) Applicant: YAMAHA HATSUDOKI KABUSHIKI KAISHA, Iwata (JP)

(72) Inventor: Tatsuya Tanaka, Shizuoka (JP)

(73) Assignee: YAMAHA HATSUDOKI KABUSHIKI KAISHI, Shizuoka (JP)

(*) Notice: Subject to any disclaimer, the term of this patent is extended or adjusted under 35 U.S.C. 154(b) by 217 days.

(21) Appl. No.: 17/851,080

(22) Filed: Jun. 28, 2022

(65) Prior Publication Data
US 2023/0134397 A1   May 4, 2023

(30) Foreign Application Priority Data

Oct. 29, 2021   (JP) .................................. 2021-178260

(51) Int. Cl.
*B62K 11/00*   (2006.01)
*B62J 1/08*   (2006.01)
*B62J 25/04*   (2020.01)

(52) U.S. Cl.
CPC ................. *B62K 11/00* (2013.01); *B62J 1/08* (2013.01); *B62J 25/04* (2020.02)

(58) Field of Classification Search
CPC .... B62K 11/00; B62K 5/01; B62J 1/08; B62J 25/04; B62J 25/06
See application file for complete search history.

(56) References Cited

U.S. PATENT DOCUMENTS

| 4,451,057 A * | 5/1984 | Lawson | F02B 61/02 |
|  |  |  | 280/291 |
| 5,794,976 A * | 8/1998 | Stevicks | B62J 15/00 |
|  |  |  | 280/847 |
| 6,270,106 B1 * | 8/2001 | Maki | B62K 5/01 |
|  |  |  | 180/21 |
| 6,390,488 B1 * | 5/2002 | Wallingsford | B62J 25/06 |
|  |  |  | 296/75 |

(Continued)

FOREIGN PATENT DOCUMENTS

EP   3984871 A1 *   4/2022   ............. B62J 17/00
JP   2022066070 A *   4/2022   ............. B62J 17/00

OTHER PUBLICATIONS

Tanaka, "Vehicle,", U.S. Appl. No. 17/851,077, filed Jun. 28, 2022.
(Continued)

*Primary Examiner* — Paul N Dickson
(74) *Attorney, Agent, or Firm* — Keating & Bennett, LLP

(57) ABSTRACT

A straddled vehicle includes a footrest including a center step and a rear step. When a perpendicular bisector of a first line segment connecting a front end and a rear end of the rear step is defined as an imaginary first reference line, a center of gravity of the straddled vehicle is ahead of the first reference line and the grounding point of the rear wheel is behind the first reference line when the first line segment is horizontal. When a second line segment connects a front end and a rear end of the center step, and a straight line perpendicular to the second line segment and extending through the rear end of the first step is defined as an
(Continued)

imaginary second reference line, the center of gravity of the straddled vehicle is behind the second reference line within a range of about 100 mm or is ahead of the second reference line.

16 Claims, 11 Drawing Sheets

(56) References Cited

U.S. PATENT DOCUMENTS

| | | | | |
|---|---|---|---|---|
| 6,968,917 | B2* | 11/2005 | Rondeau | B62J 7/06 180/908 |
| 7,287,773 | B1* | 10/2007 | Stahel | B62J 25/04 280/288.4 |
| 7,743,864 | B2* | 6/2010 | Tweet | B60N 2/64 180/908 |
| 8,196,692 | B2* | 6/2012 | Davis | B60G 21/0551 180/312 |
| 2003/0025289 | A1* | 2/2003 | Furuhashi | B60R 3/002 280/163 |
| 2004/0079561 | A1* | 4/2004 | Ozawa | B60P 3/423 180/21 |
| 2004/0108158 | A1* | 6/2004 | Rondeau | B62D 33/02 180/311 |
| 2004/0239088 | A1* | 12/2004 | Rondeau | B62J 9/23 280/769 |
| 2008/0179125 | A1* | 7/2008 | Glover | B62K 11/04 180/219 |
| 2009/0250282 | A1 | 10/2009 | Davis et al. | |
| 2012/0211290 | A1* | 8/2012 | Davis | B62J 25/08 280/788 |
| 2013/0264368 | A1* | 10/2013 | Shigeta | B62J 25/04 224/413 |
| 2018/0009500 | A1 | 1/2018 | Lovold et al. | |

OTHER PUBLICATIONS

Tanaka et al., "Vehicle,", U.S. Appl. No. 17/851,078, filed Jun. 28, 2022.

* cited by examiner

STRADDLED VEHICLE

CROSS REFERENCE TO RELATED APPLICATIONS

This application claims the benefit of priority to Japanese Patent Application No. 2021-178260 filed on Oct. 29, 2021. The entire contents of this application are hereby incorporated herein by reference.

BACKGROUND OF THE INVENTION

1. Field of the Invention

The present invention relates to straddled vehicles, and more specifically to an ATV (All Terrain Vehicle) and the like.

2. Description of the Related Art

As an example of conventional techniques of this kind, U.S. Patent Application Publication No. 2009/0250282 discloses an RUV (Recreational Utility Vehicle). As U.S. Patent Application Publication No. 2009/0250282 shows in its FIG. 35, the RUV can carry two or more people, and includes a foot board assembly provided between the front wheels and rear wheels in a side view, a saddle seat assembly provided above the foot board assembly, and a handlebar provided ahead of the saddle seat assembly. The foot board assembly includes a first footrest for the rider, a second footrest for a passenger, and a transition portion connecting the first and the second footrests.

Normally in this type of vehicle, the vehicle's center of gravity is considered to be near a vertical line which passes through the center between the front wheel and the rear wheel in a side view. In the RUV disclosed in U.S. Patent Application Publication No. 2009/0250282, the vehicle's center of gravity is considered to be near a vertical line which passes through the center of the transition portion which connects the first and the second footrests.

In this type of RUV, when climbing a steep hill, the front wheels are higher and the vehicle's body tilts backward such that the vehicle's center of gravity shifts rearward. Therefore, in the vehicle disclosed in U.S. Patent Application Publication No. 2009/0250282, it is considered that when the RUV tilts until the transition portion becomes horizontal, the RUV's center of gravity comes to a position which is more rearward than the perpendicular bisector of the transition portion. This limits the posture of the people on the RUV, and may interfere with riding comfort. There is room for improvement in the drivability of the vehicle disclosed in U.S. Patent Application Publication No. 2009-0250282.

SUMMARY OF THE INVENTION

Therefore, preferred embodiments of the present invention provide straddled vehicles each having improved drivability.

According to a preferred embodiment of the present invention, a straddled vehicle includes a body, a front wheel at a front portion of the body, a rear wheel at a rear portion of the body, and a footrest in the body and including a first step and a second step behind the first step and rising upward and rearward when the body is horizontal. When a first line segment connects a front end and a rear end of the second step in a side view of the straddled vehicle, and a perpendicular bisector of the first line segment is defined as an imaginary first reference line, a center of gravity of the straddled vehicle is ahead of the first reference line and a grounding point of the rear wheel is behind the first reference line in the side view when the first line segment is horizontal.

According to a preferred embodiment of the present invention, when the first line segment is horizontal in the side view, the center of gravity of the straddled vehicle is ahead of the first reference line and the grounding point of the rear wheel is behind the first reference line. Therefore, it is possible to increase the freedom of a riding posture. When traveling on uphill ground with the straddled vehicle, the rider is able to put his/her foot on the second step, and assume a comfortable riding posture and therefore enjoy a comfortable ride. Thus, the straddled vehicle is able to provide improved drivability.

Preferably, when a second line segment connects a front end and a rear end of the first step in the side view, and a straight line perpendicular to the second line segment and extending through the rear end of the first step is defined as an imaginary second reference line, the center of gravity of the straddled vehicle is behind the second reference line within a range of about 100 mm or is ahead of the second reference line and the grounding point of the rear wheel is behind the second reference line in the side view when the body is horizontal. In this case, in the side view, when the body is horizontal (in a state in which the second line segment is substantially horizontal), the center of gravity of the straddled vehicle is within about 100 mm behind the second reference line or is ahead of the second reference line, and the grounding point of the rear wheel is behind the second reference line. Therefore, it is possible to increase the freedom of a riding posture. When traveling on flat ground with the straddled vehicle, the rider is able to put his/her foot on the center step, and assume a comfortable riding posture and therefore enjoy a comfortable ride.

Further preferably, the first line segment has an inclination angle with respect to the second line segment within a range of not smaller than about 10 degrees and not greater than about 50 degrees in a side view when the first line segment is horizontal, an angle defined by a straight line connecting a middle point of the first line segment with the center of gravity of the straddled vehicle and the first reference line is within a range of not smaller than about 25 degrees and not greater than about 70 degrees in the side view, and an angle defined by a straight line connecting the middle point of the first line segment with a grounding point of the rear wheel and the first reference line is within a range of not smaller than about 0 degrees and not greater than about 35 degrees in the side view. In this case, the rider is able to travel more comfortably when traveling on uphill ground.

Further, preferably, the straddled vehicle further includes a handle provided in the body at a more forward position than the rear wheel when the first line segment is horizontal, wherein a location where the handle is attached to the body is ahead of the first reference line in the side view when the body is horizontal, and the location where the handle is attached is ahead of the second reference line in the side view. In this case, in the side view, the handle attaching position is not only ahead of the first reference line when the first line segment is horizontal, but also is ahead of the second reference line when the body is horizontal (when the second line segment is substantially horizontal). Therefore, regardless of whether the ground is flat or uphill, it is possible to stabilize the positional relationship between the rider and the handle, and therefore the rider is able to enjoy his/her ride more comfortably.

Preferably, when the first line segment is horizontal, the handle is within a range of not smaller than about −10 degrees and not greater than about 35 degrees with respect to the first reference line in the side view when the body is horizontal, and the handle is within a range of not smaller than about 15 degrees and not greater than about 40 degrees with respect to the second reference line in the side view. In this case, the rider is able to travel more comfortably when traveling on uphill ground.

Further preferably, the first step is where a rider puts his/her foot when the body is horizontal, and the second step is where the rider puts his/her foot when the body is inclined. In this case, when traveling on flat ground with the straddled vehicle, the rider is able to put his/her foot on the first step. On the other hand, when traveling on uphill ground with the straddled vehicle, the rider is able to put his/her foot on the second step. In each of the cases the rider is able to enjoy a comfortable ride.

Further, preferably, the first step is substantially horizontal when the body is horizontal. In this case, when traveling on flat ground with the straddled vehicle, the rider is able to put his/her foot on the first step and enjoy a more comfortable ride.

Preferably, the second step includes a region where the foot is placed such that a line which connects a front end and a rear end thereof rises rearward. In this case, when traveling on uphill ground with the straddled vehicle, the rider is able to put his/her foot on the second step and enjoy a more comfortable ride.

Further preferably, the first step has a length not smaller than about 250 mm, and a width not smaller than about 130 mm. In this case, when traveling on flat ground with the straddled vehicle, the rider is able to put his/her foot on the first step securely.

Further preferably, the second step has a length not smaller than about 100 mm, and a width not smaller than about 90 mm. In this case, when traveling on uphill ground with the straddled vehicle, the rider is able to put his/her foot on the second step securely.

Preferably, the straddled vehicle further includes an anti-slip surface provided on the first step. In this case, the rider is not only helped by the primary function of the anti-slip surface, but also feels the anti-slip on his/her sole thus recognizing the position of the first step, and therefore is able to put his/her foot easily onto the first step.

Further preferably, the straddled vehicle further includes an anti-slip surface provided on the second step. In this case, the rider is not only helped by the primary function of the anti-slip surface, but also feels the anti-slip surface on his/her sole thus recognizing the position of the second step, and therefore is able to put his/her foot easily onto the second step.

Further, preferably, the straddled vehicle further includes a discharge hole provided in the first step. In this case, even if the footrest becomes dirty with water, mud, and other foreign matters, it is possible to discharge these foreign matters smoothly from the hole in the first step.

Preferably, the footrest includes a surface continuous from the first step to the second step. In this case, it is possible to switch foot positions smoothly between the first step and the second step.

Further preferably, the surface includes a flat surface in each of the first step and the second step. In this case, it is possible to put the foot comfortably on each of the first step and the second step.

Further, preferably, the first step includes a slanted surface such that an outboard side of the slanted surface is higher than an inboard side in a width direction of the vehicle. In this case, it is possible to provide the rider with options of riding positions.

Preferably, the straddled vehicle further includes a seat provided in the body. With this arrangement, a front end of the first step is located at a more forward position than a front end of the seat in a side view of the straddled vehicle and a rear end of the first step is located at a more forward position than a rear end of the seat in the side view. In this case, when performing a standing ride on flat ground, the rider is able to put his/her foot on the first step and also use his/her knees to sandwich the saddle-style seat to provide a comfortable ride.

Further preferably, the straddled vehicle further includes a seat provided in the body, and the front end and the rear end of the second step end are located at more forward positions than a rear end of the seat in the side view. In this case, when performing a standing ride on uphill ground, the rider is able to put his/her foot on the second step and also use his/her knees to sandwich the saddle-style seat to enjoy a comfortable ride.

It is noted here that in preferred embodiments of the present invention, the term "grounding point of the rear wheel" refers to a contact point of the rear wheel with a horizontal surface, and if the rear wheel is in surface contact with the horizontal surface, the term refers to the center of the contact surface in the side view.

Also, if the first step and the second step are connected with each other by a curved line in the side view, an imaginary point of intersection between an extension of the first step and an extension of the second step is obtained when the body is horizontal as a reference, and then, a point of intersection of a vertical line extending through the imaginary intersection and the curved line is taken as the rear end of the first step and the front end of the second step.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
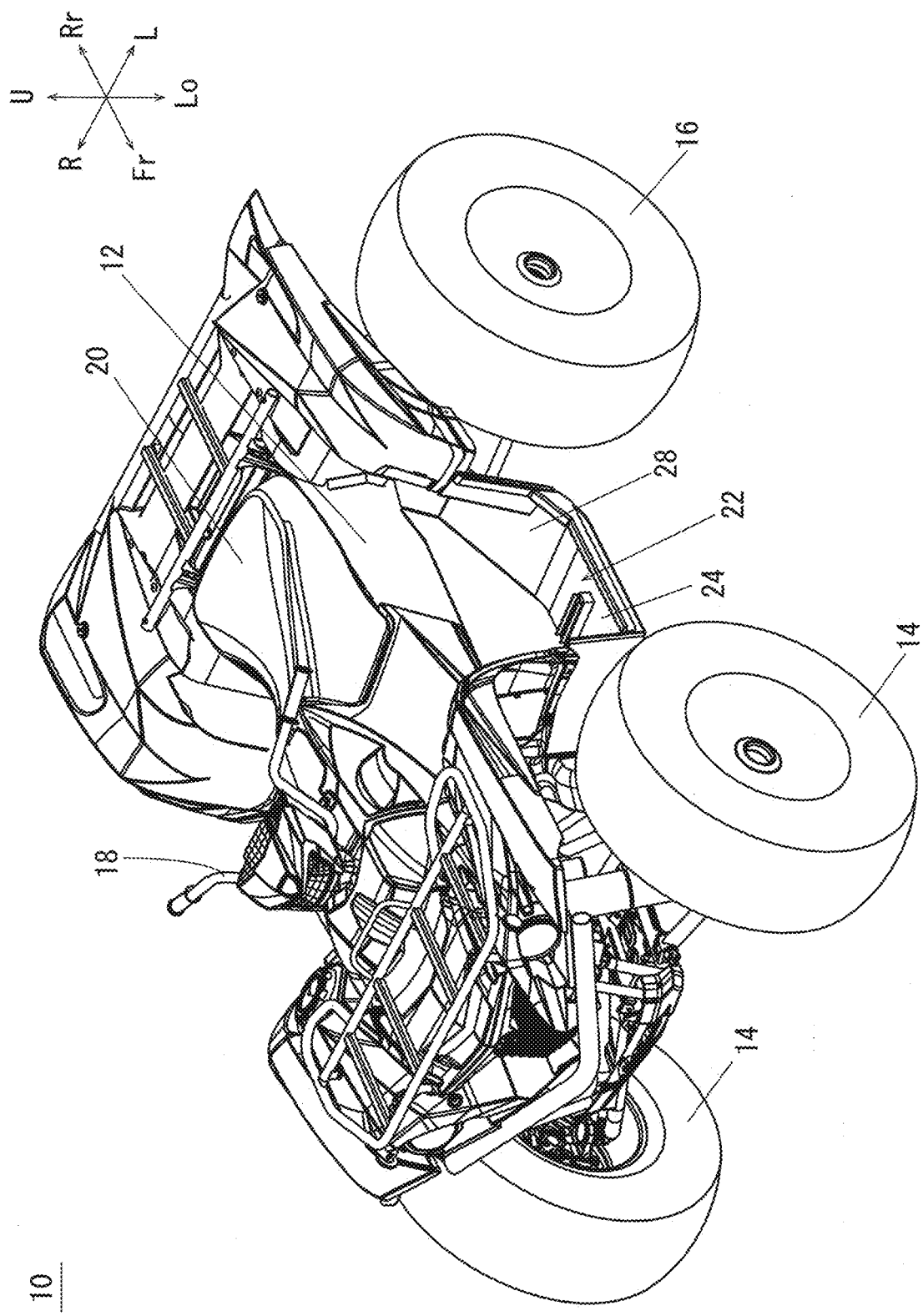
FIG. 1 is a perspective view which shows a straddled vehicle according to a preferred embodiment of the present invention.

Hereinafter, preferred embodiments of the present invention will be described with reference to the drawings.

In the drawings, "Fr" indicates forward, "Rr" indicates rearward, "R" indicates rightward, "L" indicates leftward, "U" indicates upward, and "Lo" indicates downward.

Figure 2:
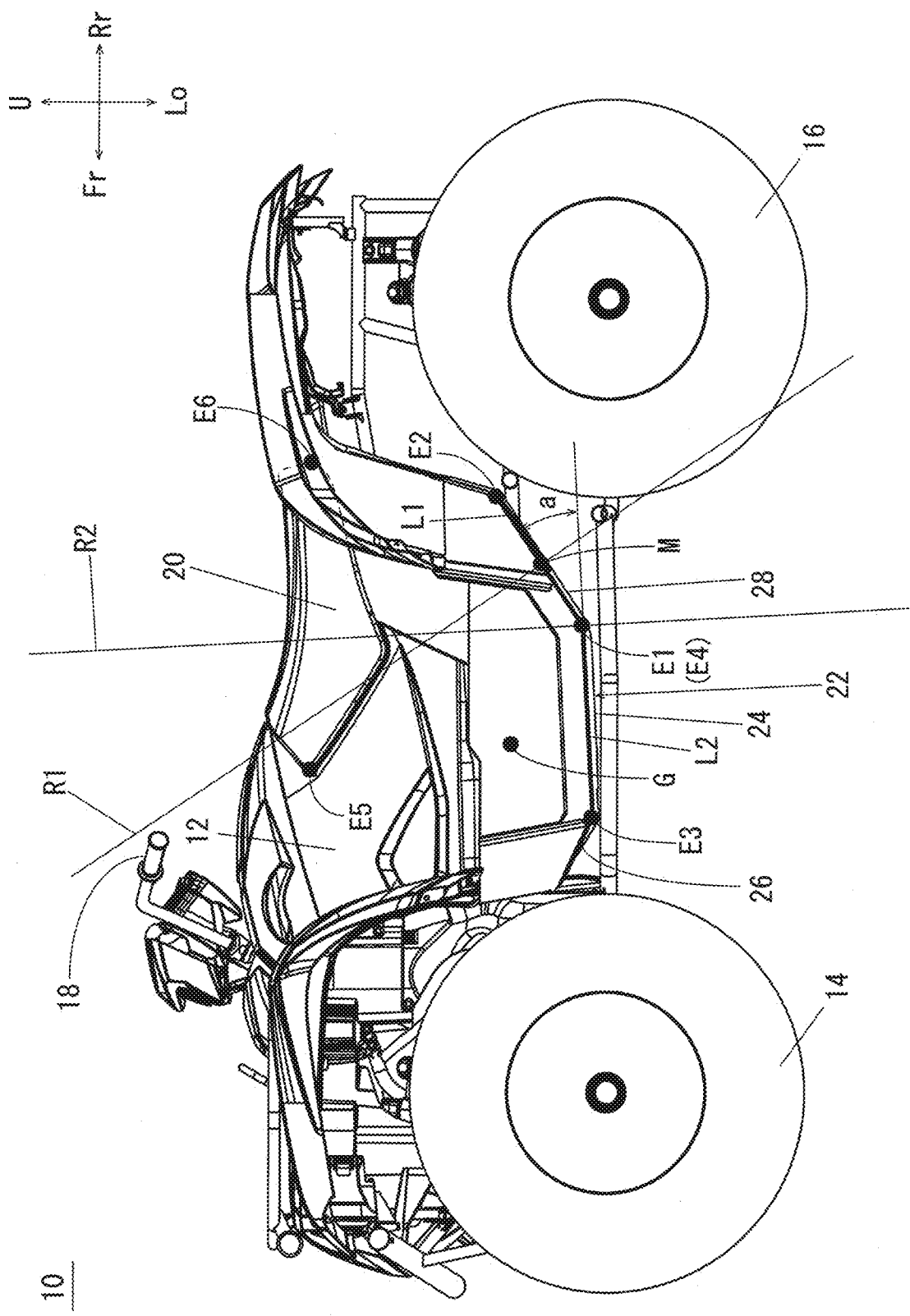
FIG. 2 is a side view which shows the straddled vehicle in FIG. 1.

Referring to FIG. 1 and FIG. 2, a straddled vehicle 10 according to a preferred embodiment of the present invention is, for example, a four-wheel type ATV for one person, and includes a body 12, a pair of front wheels 14 provided in a forward portion of the body 12, a pair of rear wheels 16 provided in a rearward portion of the body 12, a bar handle 18 provided in the body 12, a saddle-style seat 20 provided in the body 12, and a pair of footrests 22 provided in the body 12. Note that FIG. 1 shows only left ones of the pair of rear wheels 16 and the pair of footrests 22. The bar handle 18 is provided at an intermediate region in the vehicle's width direction, and in a side view at a position above the front wheels 14 and more forward than the rear wheels 16. The saddle-style seat 20 is provided at an intermediate portion in the vehicle's width direction, and in a side view at a higher position than the front wheels 14 and the rear wheels 16, between the front wheels 14 and the rear wheels 16.

Hereinafter, the left footrest 22 will be described. The pair of footrests 22 are symmetrical to each other, and the right footrest 22 is arranged essentially the same as the left footrest 22, so description therefor will be skipped.

Figure 3:
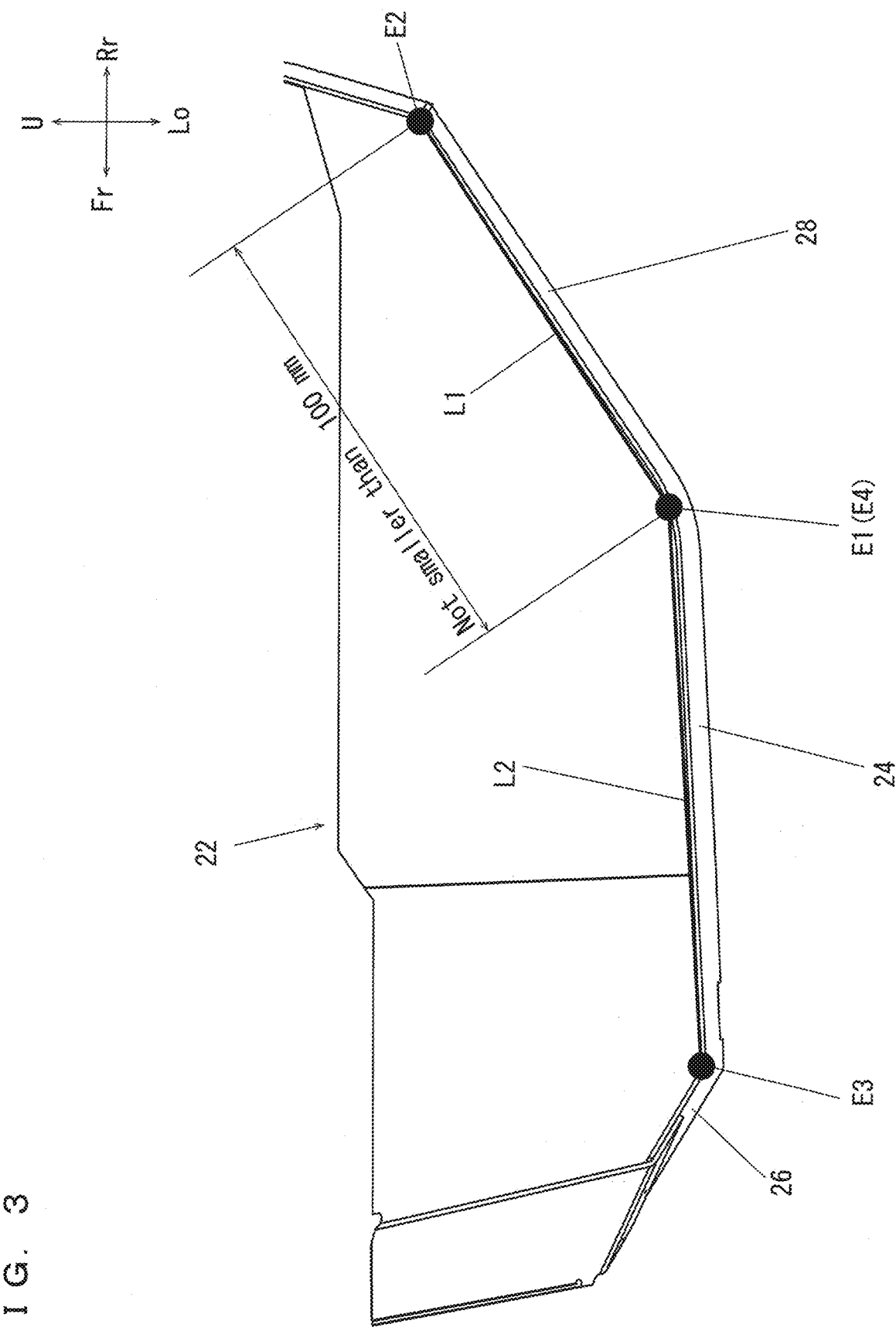
FIG. 3 is an illustration of a section of a footrest.
Figure 4:
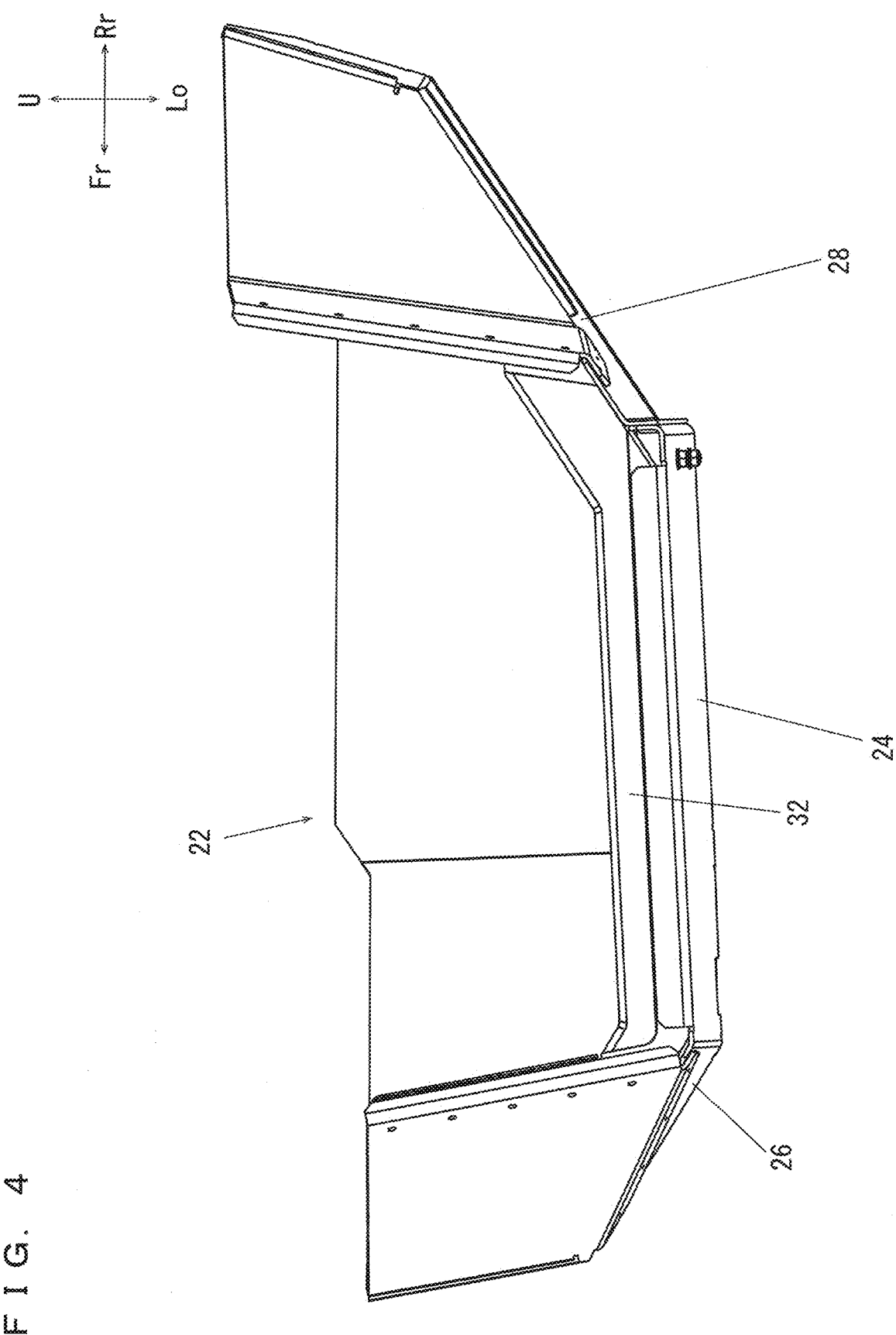
FIG. 4 is a side view which shows the footrest.
Figure 5:
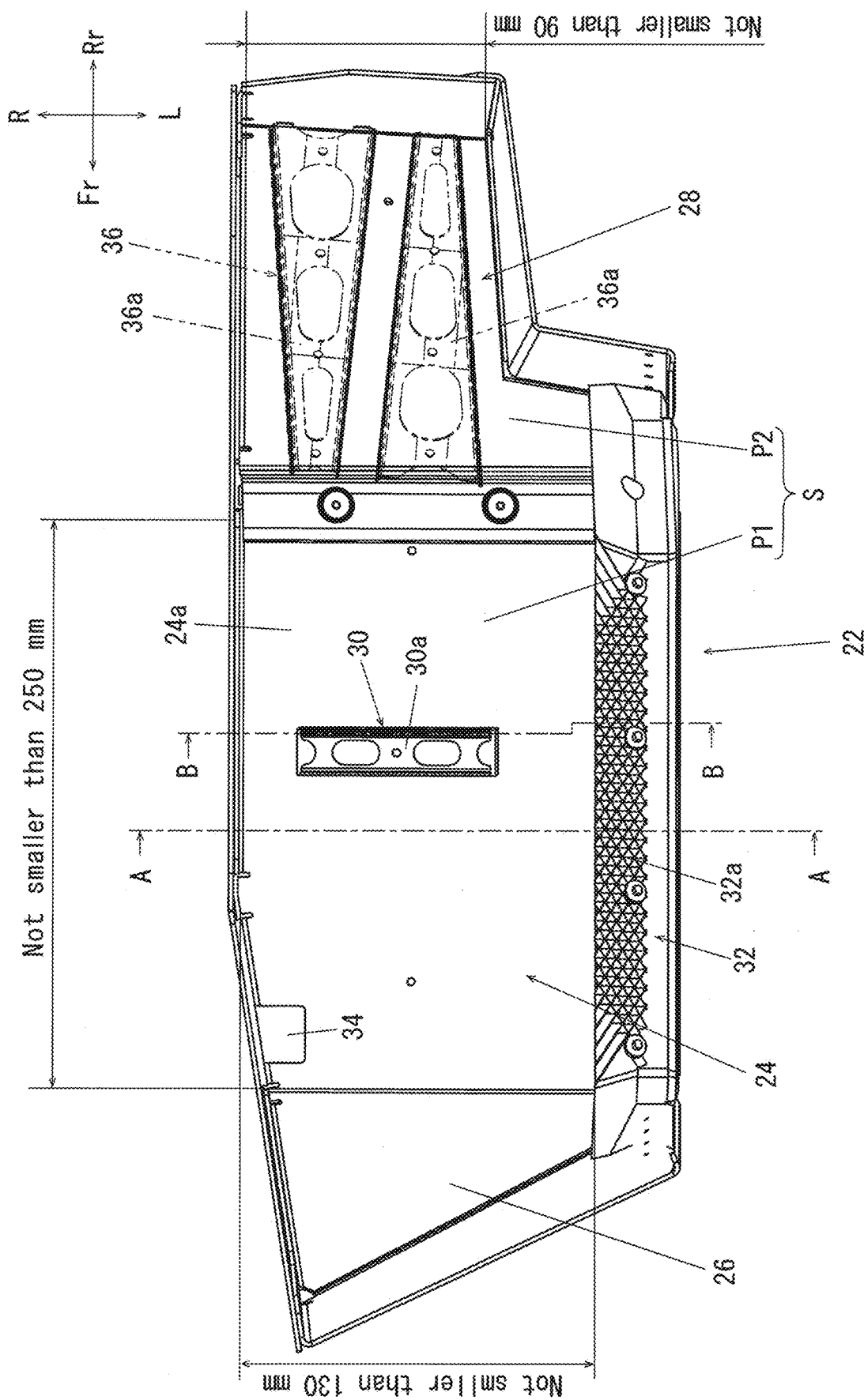
FIG. 5 is a plan view which shows the footrest.

Referring also to FIG. 3 through FIG. 5, the footrest 22 is for the rider to put his/her foot, is provided between the front wheel 14 and the rear wheel 16 in a side view, and includes a center step 24, a front step 26, and a rear step 28.

Figure 6A:
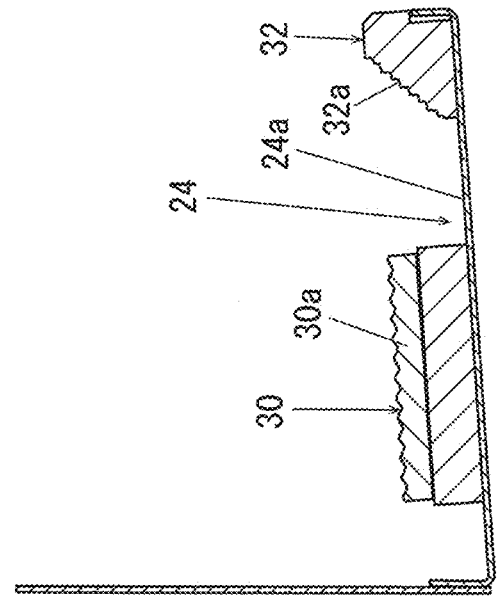
FIG. 6A is a sectional A-A end view of the footrest.
Figure 6B:
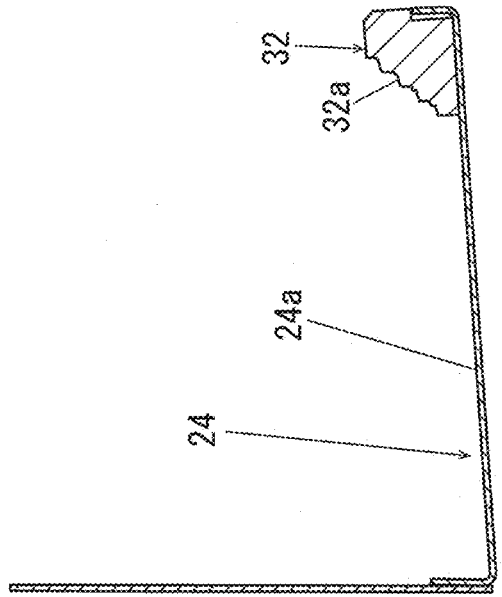
FIG. 6B is a sectional B-B end view of the footrest.

The center step 24 is where the rider puts his/her foot when the body is horizontal, and is substantially horizontal when the body is horizontal. For example, the center step 24 is angled with respect to the horizontal plane with a forward and downward inclination of not smaller than about 0 degrees and not greater than about 4 degrees. Also, the center step 24 includes a slanted surface 24a which has an outboard side higher than an inboard side in a width direction of the vehicle (see FIGS. 6A and 6B).

The front step 26 is provided ahead of the center step 24 and extends diagonally upward and forward. In other words, the front step 26 inclines diagonally upward and forward with respect to the center step 24. This gives the footrest 22 an angle of attack at its front portion.

The rear step 28 is provided behind the center step 24 and rises upward and rearward when the body is horizontal. The rear step 28 is a portion where the rider is able to put his/her foot when the body is tilted, and is oriented such that a line which connects a front end E1 with a rear end E2 of a foot-resting area rises rearward. In other words, the rear step 28 inclines diagonally upward and rearward with respect to the center step 24 so that a rear portion of the rear step 28 is at a higher position than the center step 24.

The footrest 22 includes a surface S that is continuous from the center step 24 through the rear step 28. The surface S has flat surfaces P1, P2 in the center step 24 and the rear step 28 respectively. Preferably, the center step 24 has a length not smaller than about 250 mm, and a width not smaller than about 130 mm; and the rear step 28 has a length not smaller than about 100 mm and a width not smaller than about 90 mm.

The center step 24 is further provided with anti-slip surfaces 30, 32 and a hole 34 to discharge foreign matters. The anti-slip surface 30 is, for example, bar-shaped, and extends in a width direction of the vehicle in an area slightly behind a fore-aft center of the center step 24. The anti-slip surface 30 includes a metal plate 30a which has serration-shaped spikes. The anti-slip surface 32 extends in a fore-aft direction in an outboard end region of the center step 24. The anti-slip surface 32 includes a concavo-convex portion 32a including a large number of cone-shaped convexities. The hole 34 is provided on a front inboard side of the center step 24.

Referring to FIG. 2, the center step 24 includes a front end E3 at a more forward position than a front end E5 of the saddle-style seat 20 in a side view. The center step 24 has a rear end E4 at a more forward position than a rear end E6 of the saddle-style seat 20 in a side view. The front end E1 and the rear end E2 of the rear step 28 are at more forward positions than the rear end E6 of the saddle-style seat 20 in a side view.

Figure 7:
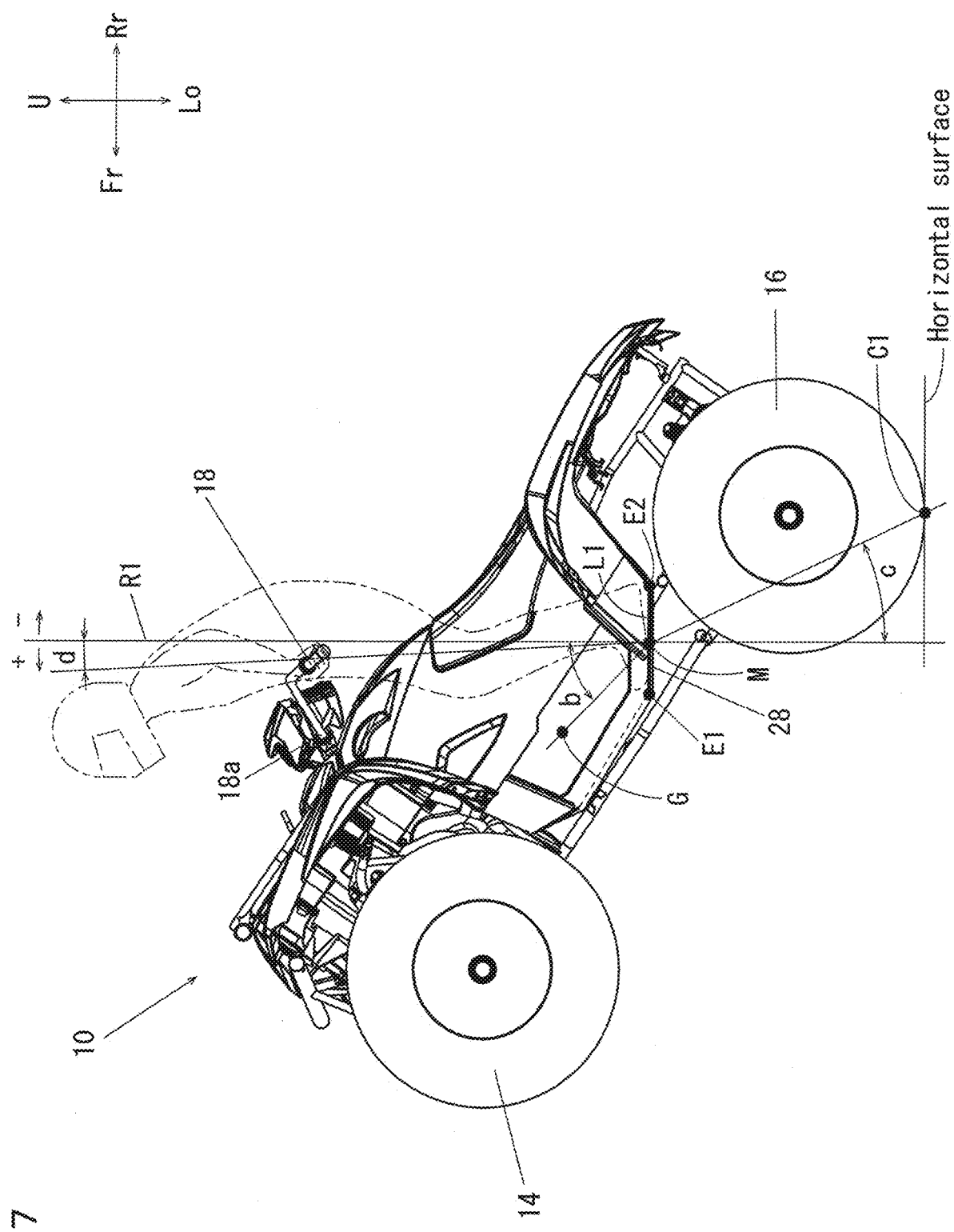
FIG. 7 is a side view which shows a riding posture in a situation when a first line segment is horizontal.

Referring to FIG. 2, FIG. 3, and FIG. 7, in a side view, a first line segment L1 connects the front end E1 and the rear end E2 of the rear step 28, and a perpendicular bisector of the first line segment L1 is an imaginary first reference line R1. In this case, in a side view, when the first line segment L1 is horizontal, the center of gravity G of the straddled vehicle 10 is ahead of the first reference line R1 and a grounding point C1 of the rear wheel 16 is behind the first reference line R1.

Now assume further that "a" represents an inclination angle of the first line segment L1 with respect to a second line segment L2; "b" represents an angle defined by a straight line which connects the middle point M of the first line segment L1 with the center of gravity G of the straddled vehicle 10 and the first reference line R1; and "c" represents an angle defined by a straight line which connects the middle point M of the first line segment L1 and the grounding point C1 of the rear wheel 16 and the first reference line R1. In this case, the inclination angle "a" is within a range of not smaller than about 10 degrees and not greater than about 50 degrees in a side view; and when the first line segment L1 is horizontal, the angle "b" is within a range of not smaller than about 25 degrees and not greater than about 70 degrees in a side view; and the angle "c" is within a range of not smaller than about 0 degrees and not greater than about 35 degrees in a side view.

In a side view, when the first line segment L1 is horizontal, an attaching position 18a of the bar handle 18 is ahead of the first reference line R1. Also, in a side view, when the first line segment L1 is horizontal, the bar handle 18 (the center of the grip) is within a range of not smaller than about −10 degrees and not greater than about 35 degrees with respect to the first reference line R1. In other words, assume an angle "d" as an angle defined by a straight line which connects the middle point M of the first line segment L1 with the center of grip of the bar handle 18 and the first reference line R1. In this case, the angle "d" is within a range of not smaller than about −10 degrees and not greater than about 35 degrees in a side view.

Figure 8:
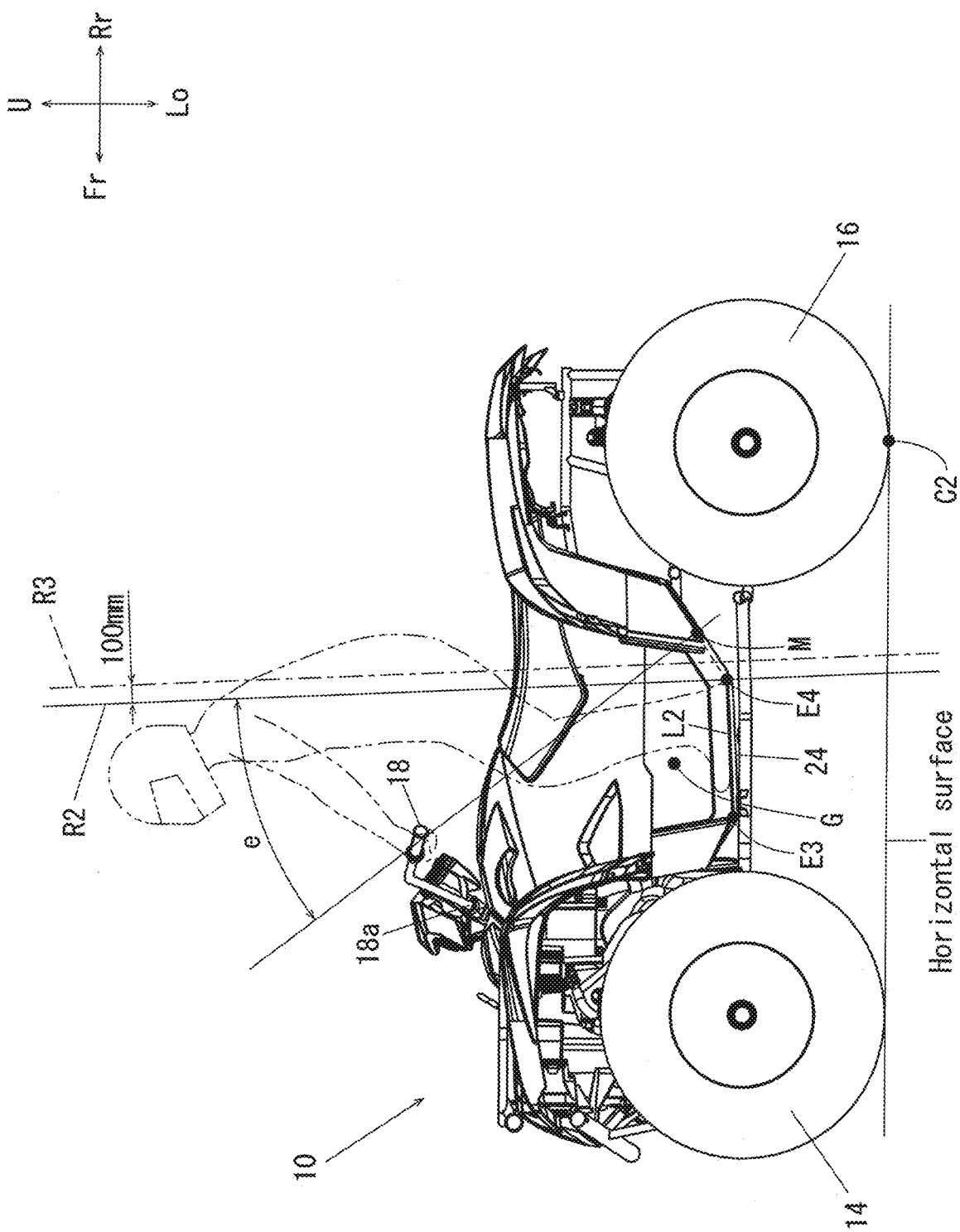
FIG. 8 is a side view which shows a riding posture when a body is horizontal.

Referring to FIG. 2, FIG. 3, and FIG. 8, in a side view, assume an imaginary second reference line R2 is a straight line perpendicular to the second line segment L2 that connects the front end E3 and the rear end E4 of the center step 24, and extends through the rear end E4 of the center step 24. In this case, in a side view, when the body is horizontal, i.e., in a state where the straddled vehicle 10 is on a horizontal plane (under a state in which the second line segment L2 is substantially horizontal), the center of gravity G of the straddled vehicle 10 is behind the second reference line R2 within a range of about 100 mm or is ahead of the second reference line R2, and a grounding point C2 of the rear wheel 16 is behind the second reference line R2. In other words, in the side view, when the body is horizontal, the center of gravity G of the straddled vehicle 10 is ahead of a line R3 parallel to the second reference line R2 about 100 mm behind the second reference line R2, and the grounding point C2 of the rear wheel 16 is behind the second reference line R2.

In a side view, when the body is horizontal, the attaching position 18a of the bar handle 18 is ahead of the second reference line R2. Also, in a side view, when the body is horizontal, the bar handle 18 (the center of the grip) is within a range of not smaller than about 15 degrees and not greater than about 40 degrees with respect to the second reference line R2. In other words, assume an angle "e" as an angle defined by a straight line which connects the middle point M of the first line segment L1 with the center of grip of the bar handle 18 and the second reference line R2. In this case, the angle "e" is within a range of not smaller than about 15 degrees and not greater than about 40 degrees in a side view.

In a preferred embodiment of the present invention, the center step 24 represents the first step and the rear step 28 represents the second step.

According to the straddled vehicle 10 described thus far, in a side view, when the first line segment L1 is horizontal, the center of gravity G of the straddled vehicle 10 is ahead of the first reference line R1 and the grounding point C1 of the rear wheel 16 is behind the first reference line R1. Therefore, it is possible to increase the freedom of a riding posture. When traveling on uphill ground with the straddled vehicle 10, the rider is able to put his/her foot on the rear step 28, and assume a comfortable riding posture and therefore enjoy a comfortable ride.

In a side view, when the body is horizontal (in the state in which the second line segment L2 is substantially horizontal), the center of gravity G of the straddled vehicle 10 is within about 100 mm behind the second reference line R2 or is ahead of the second reference line R2, and the grounding point C2 of the rear wheel 16 is behind the second reference line R2. Therefore, it is possible to increase the freedom of a riding posture. When traveling on flat ground with the straddled vehicle 10, the rider is able to put his/her foot on the center step 24, and assume a comfortable riding posture and therefore enjoy a comfortable ride.

When the inclination angle "a" of the first line segment L1 with respect to the second line segment L2 is within the range of not smaller than about 10 degrees and not greater than about 50 degrees and the first line segment L1 is horizontal in a side view, the angle "b" defined by the straight line which connects the middle point M of the first line segment L1 with the center of gravity G of the straddled vehicle 10 and the first reference line R1 is within the range of not smaller than about 25 degrees and not greater than about 70 degrees in the side view, and the angle "c" defined by the straight line which connects the middle point M of the first line segment L1 with the grounding point C1 of the rear wheel 16 and the first reference line R1 is within the range of not smaller than about 0 degrees and not greater than about 35 degrees in the side view. With this arrangement, the rider is able to enjoy his/her ride more comfortably when traveling on uphill ground.

In a side view, the attaching position 18a of the bar handle 18 is not only ahead of the first reference line R1 when the first line segment L1 is horizontal, but also is ahead of the second reference line R2 when the body is horizontal (when the second line segment L2 is substantially horizontal). Therefore, regardless of whether the ground is flat or uphill, it is possible to stabilize the positional relationship between the rider and the bar handle 18, and therefore the rider is able to enjoy his/her ride more comfortably.

In a side view, when the first line segment L1 is horizontal, the bar handle 18 is within the range of not smaller than about −10 degrees and not greater than about 35 degrees with respect to the first reference line R1. In a side view, when the body is horizontal (when the second line segment L2 is substantially horizontal), the bar handle 18 is within the range of not smaller than about 15 degrees and not greater than about 40 degrees with respect to the second reference line R2. Therefore, the rider is able to travel more comfortably when traveling on uphill ground.

When traveling on flat ground with the straddled vehicle 10, the rider is able to put his/her foot on the center step 24. On the other hand, when traveling on uphill ground with the straddled vehicle 10, the rider is able to put his/her foot on the center step 28. In each of the cases the rider is able to enjoy a comfortable ride.

Since the center step 24 is substantially horizontal when the body is horizontal, the rider is able to put his/her foot on the center step 24 and enjoy his/her ride more comfortably when traveling on flat ground with the straddled vehicle 10.

The rear step 28 is oriented so that the line which connects the front end E1 with the rear end E2 of the foot-resting area rises rearward. Therefore, when traveling on uphill ground with the straddled vehicle 10, the rider is able to put his/her foot on the rear step 28, and enjoy his/her ride more comfortably.

Since the center step 24 has the length not smaller than about 250 mm and the width not smaller than about 130 mm, the rider is able to put his/her foot on the center step 24 securely when traveling on flat ground with the straddled vehicle 10.

Since the rear step 28 has the length not smaller than about 100 mm and the width not smaller than about 90 mm, the rider is able to put his/her foot on the rear step 28 securely when traveling on uphill ground with the straddled vehicle 10.

Since the center step 24 has the anti-slip surface 30, the rider is not only helped by the primary function of the anti-slip surface, but also feel the anti-slip surface 30 on his/her sole thus recognizing where the center step 24 is, and able to put his/her foot easily onto the center step 24.

Even if the footrest 22 becomes dirty with water, mud, and other foreign matters, they can be smoothly discharged from the hole 34 in the center step 24.

Since the footrest 22 includes the surface S continuous from the center step 24 through the rear step 28, the rider is able to smoothly switch positions of his/her foot between the center step 24 and the rear step 28.

Since the surface S of the footrest 22 has the flat planes P1, P2 respectively in the center step 24 and the rear step 28, the rider is able to put his/her foot comfortably on each of the center step 24 and the rear step 28.

Since the center step 24 includes the slanted surface 24a which has an outboard side higher than an inboard side in the vehicle's width direction, it is possible to provide the rider with options of riding positions.

The front end E3 of the center step 24 is at a more forward position than the front end E5 of the saddle-style seat 20 in a side view. The rear end E4 of the center step 24 is at a more forward position than the rear end E6 of the saddle-style seat 20 in a side view. Therefore, when performing a standing ride on flat ground, the rider is able to put his/her foot on the center step 24 and also use his/her knees to sandwich the saddle-style seat 20 to provide a comfortable ride.

The front end E1 and the rear end E2 of the rear step 28 are at more forward positions than the rear end E6 of the saddle-style seat 20 in a side view. Therefore, when performing a standing ride on uphill ground, the rider is able to put his/her foot on the rear step 28 and also use his/her knees to sandwich the saddle-style seat 20 to provide a comfortable ride.

With the arrangement that the footrest 22 has an angle of attack at its front portion, it is possible to deflect obstacles from ahead with the front portion of the footrest 22 during riding.

It is noted here with reference to FIG. 5, that the rear step 28 may have an anti-slip surface 36. The anti-slip surface 36 includes two metal plates 36a which have serration-shaped spikes. Each metal plate 36a extends in a fore-aft direction on the rear step 28. By providing the rear step 28 with the anti-slip surface 36 as described, the rider is not only helped by the primary function of the anti-slip surface, but also feel the anti-slip 36 on his/her sole thus recognizing where the rear step 28 is, and able to put his/her foot easily onto the rear step 28.

Figure 9:
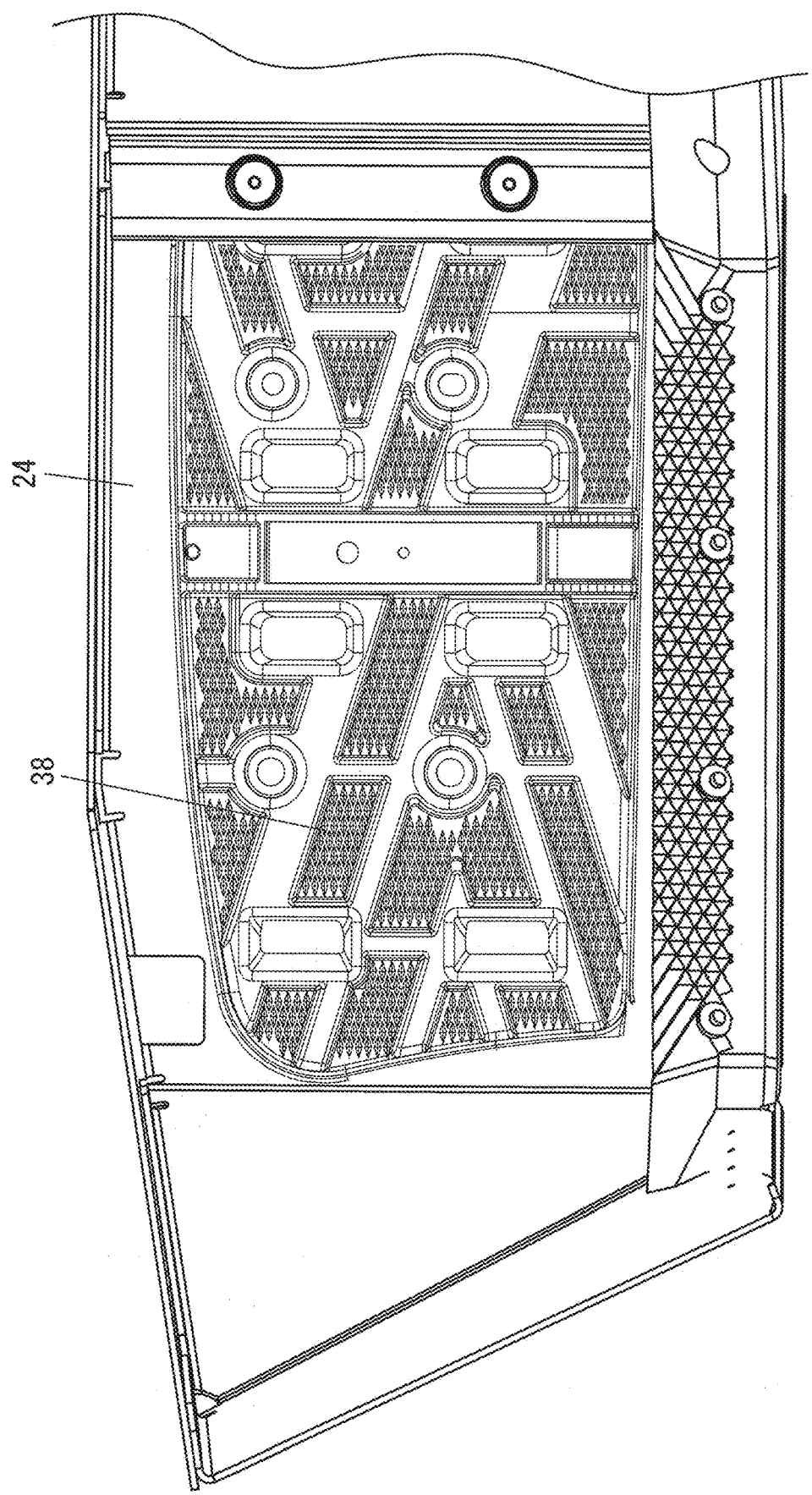
FIG. 9 is an illustrative drawing which shows another example of an anti-slip surface provided on the footrest.
Figure 10:
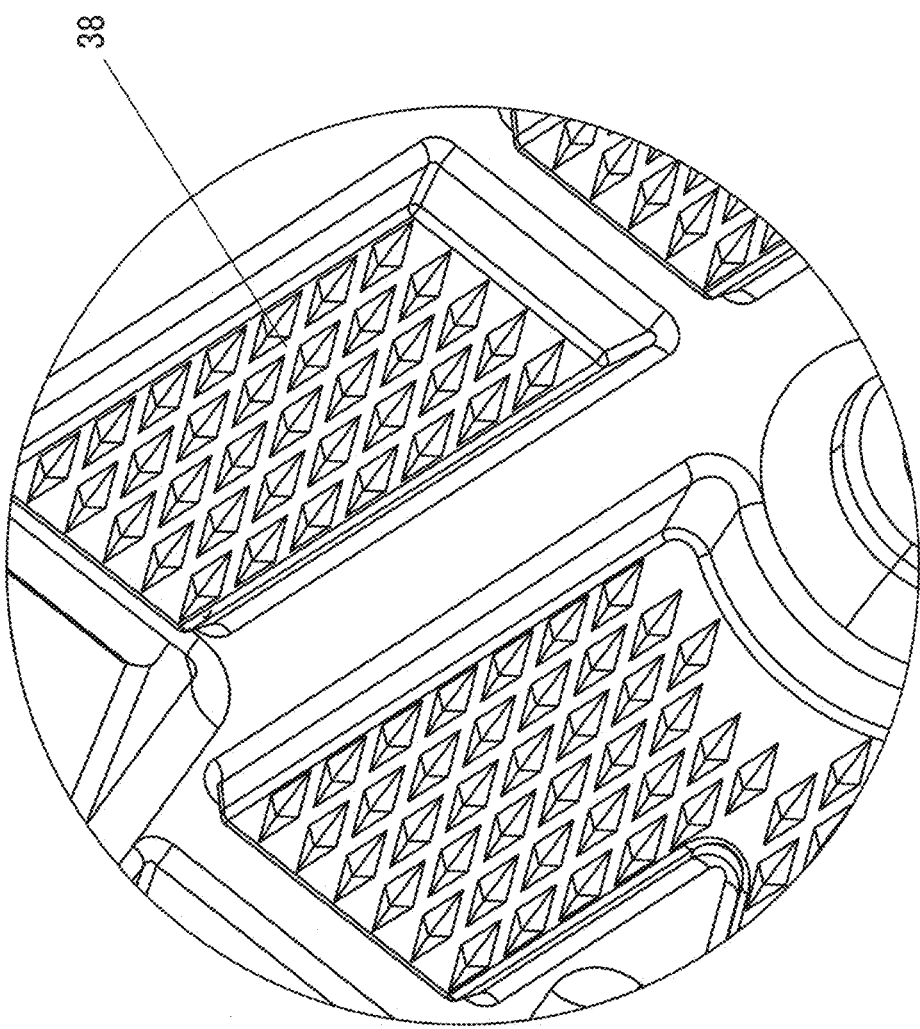
FIG. 10 is an enlarged partial view of the anti-slip surface shown in FIG. 9.

As another arrangement, the center step 24 may be provided with an anti-slip surface 38 as shown in FIG. 9 and FIG. 10, instead of the anti-slip surface 30. For example, the anti-slip surface 38 may include a large number of cone-shaped convexities, and is integral with the center step 24.

In a preferred embodiment of the present invention, the rear end of the center step and the front end of the rear step are determined in the manner described below.

Figure 11A:
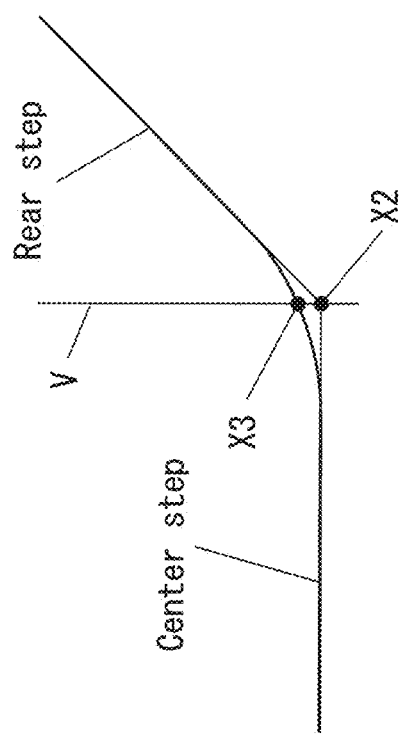
FIGS. 11A and 11B are illustrative drawings for describing a rear end of a center step and a front end of a rear step.

Referring to FIG. 11A, in a case where the center step and the rear step are connected with each other in a folding fashion in a side view, a point of intersection X1 between the center step and the rear step is taken as the rear end of the center step and the front end of the rear step.

Figure 11B:
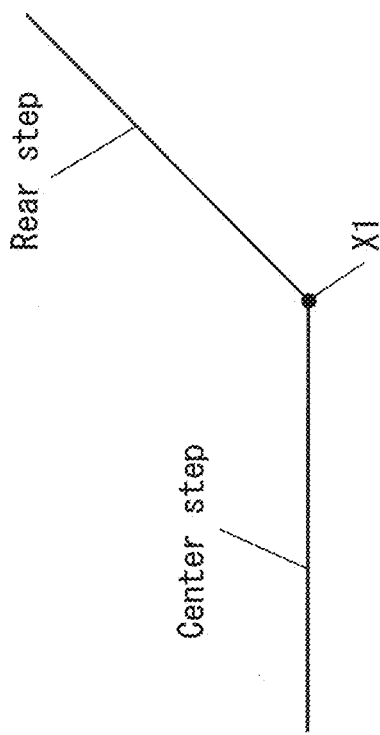

Referring to FIG. 11B, in a case where the center step and the rear step are connected with each other by a curved line in a side view, an imaginary point of intersection X2 between an extension of the center step and an extension of the rear step is obtained. Using a case when the body is horizontal as a reference, a point of intersection X3 made by a vertical line V extending through the imaginary intersection X2 and the curved line is taken as the rear end of the center step and the front end of the rear step. The footrest 22 shown in FIG. 3 represents the present case.

Also, preferred embodiments of the present invention are not limited to the case where the center step and the rear step are connected with (continuous to) each other. They may be spaced apart from each other. There may be a step provided between the center step and the rear step.

The center step and the rear step may each be a surface formed by a combination of a plurality of flat surfaces. Also, the steps are not limited to flat surfaces but may be curved surfaces.

In a preferred embodiment of the present invention described above, description was made for a case where the center step 24 is slanted and becomes higher as it extends outboard of the vehicle. In a preferred embodiment of the present invention, the rear step may also be slanted and become higher as it extends outboard of the vehicle.

In a preferred embodiment of the present invention described above, description was made for a case where the footrest 22 includes a front step 26. However, in a preferred embodiment of the present invention the footrest need not necessarily include a front step.

In a preferred embodiment of the present invention described above, description was made for a case where the straddled vehicle 10 includes a pair of front wheels 14 and a pair of rear wheels 16. However, the present invention is not limited to this. The present invention is applicable to a straddled vehicle which includes a front and rear wheels, including a plurality of at least one of the front and rear wheels.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A one person straddled vehicle comprising:
a body;
a front wheel at a front portion of the body;
a rear wheel at a rear portion of the body;
a seat on the body configured so that one person rides the straddled vehicle; and
a footrest in the body and including a first step that is substantially horizontal when the body is horizontal and a second step behind the first step and rising upward and rearward when the body is horizontal; wherein
when a first line segment connects a front end and a rear end of the second step in a side view of the straddled vehicle, and a perpendicular bisector of the first line segment is defined as an imaginary first reference line; a center of gravity of the straddled vehicle is ahead of the first reference line and a grounding point of the rear wheel is behind the first reference line in the side view when the first line segment is horizontal.

2. The one person straddled vehicle according to claim 1, wherein
in the side view when the body is horizontal, a second line segment connects a front end and a rear end of the first step in the side view, and a straight line perpendicular to the second line segment and extending through the rear end of the first step is defined as an imaginary second reference line; (1) the center of gravity of the straddled vehicle is behind the second reference line within a range of about 100 mm or is ahead of the second reference line, and (2) the grounding point of the rear wheel is behind the second reference line.

3. The one person straddled vehicle according to claim 2, further comprising:
a handle in the body at a more forward position than the rear wheel; wherein
when the first line segment is horizontal, a location where the handle is attached to the body is ahead of the first reference line in the side view; and
when the body is horizontal, the location where the handle is attached is ahead of the second reference line in the side view.

4. The one person straddled vehicle according to claim 1, wherein
when the first line segment is horizontal, the handle is within a range of not smaller than about -10 degrees and not greater than about 35 degrees with respect to the first reference line in the side view; and
when the body is horizontal, the handle is within a range of not smaller than about 15 degrees and not greater than about 40 degrees with respect to the second reference line in the side view.

5. The one person straddled vehicle according to claim 1, wherein the second step includes a region where a foot is to be placed such that a line which connects a front end and a rear end of the second step rises upward and rearward in the side view when the body is horizontal.

6. The one person straddled vehicle according to claim 1, wherein the first step has a length not smaller than about 250 mm, and a width not smaller than about 130 mm.

7. The one person straddled vehicle according to claim 1, wherein the second step has a length not smaller than about 100 mm, and a width not smaller than about 90 mm.

8. The one person straddled vehicle according to claim 1, further comprising an anti-slip surface on the first step.

9. The one person straddled vehicle according to claim 1, further comprising an anti-slip surface on the second step.

10. The one person straddled vehicle according to claim 1, further comprising a discharge hole in the first step.

11. The one person straddled vehicle according to claim 1, wherein the footrest includes a surface that is continuous from the first step to the second step.

12. The one person straddled vehicle according to claim 11, wherein the surface includes a flat surface in each of the first step and the second step.

13. The one person straddled vehicle according to claim 1, wherein the first step includes a slanted surface such that an outboard side of the slanted surface is higher than an inboard side of the slanted surface in a width direction of the vehicle.

14. The one person straddled vehicle according to claim 1, wherein
a front end of the first step is located at a more forward position than a front end of the seat in the side view, and a rear end of the first step is located at a more forward position than a rear end of the seat in the side view.

15. The one person straddled vehicle according to claim 1, wherein
the front end and the rear end of the second step are located at more forward positions than a rear end of the seat in the side view.

16. A straddled vehicle comprising:
a body;
a front wheel at a front portion of the body;
a rear wheel at a rear portion of the body; and
a footrest in the body and including a first step and a second step behind the first step and rising upward and rearward when the body is horizontal; wherein
when a first line segment connects a front end and a rear end of the second step in a side view of the straddled vehicle, and a perpendicular bisector of the first line segment is defined as an imaginary first reference line; a center of gravity of the straddled vehicle is ahead of the first reference line and a grounding point of the rear wheel is behind the first reference line in the side view when the first line segment is horizontal;
in the side view when the body is horizontal, a second line segment connects a front end and a rear end of the first step in the side view, and a straight line perpendicular to the second line segment and extending through the rear end of the first step is defined as an imaginary second reference line; (1) the center of gravity of the straddled vehicle is behind the second reference line within a range of about 100 mm or is ahead of the second reference line, and (2) the grounding point of the rear wheel is behind the second reference line;
the first line segment has an inclination angle with respect to the second line segment within a range of not smaller than about 10 degrees and not greater than about 50 degrees in the side view when the first line segment is horizontal;
an angle defined by a straight line connecting a middle point of the first line segment with the center of gravity of the straddled vehicle and the first reference line is within a range of not smaller than about 25 degrees and not greater than about 70 degrees in the side view; and
an angle defined by a straight line connecting the middle point of the first line segment with the grounding point of the rear wheel and the first reference line is within a range of not smaller than about 0 degrees and not greater than about 35 degrees in the side view.

* * * * *